(12) United States Patent
Iguchi et al.

(10) Patent No.: US 7,133,676 B2
(45) Date of Patent: Nov. 7, 2006

(54) CHANNEL SETTING METHOD IN MOBILE COMMUNICATION SYSTEM

(75) Inventors: Masayuki Iguchi, Osaka (JP); Yoichiro Yamakawa, Osaka (JP); Katsuyuki Tsuji, Osaka (JP); Yoshimitsu Sugimura, Osaka (JP); Masahiro Yoshimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 742 days.

(21) Appl. No.: 09/939,459

(22) Filed: Aug. 24, 2001

(65) Prior Publication Data

US 2002/0147020 A1    Oct. 10, 2002

(30) Foreign Application Priority Data

Apr. 4, 2001    (JP)    ............... 2001-105519

(51) Int. Cl.
*H04Q 7/20*    (2006.01)
(52) U.S. Cl. ............ 455/442; 455/443; 455/452.2
(58) Field of Classification Search ........... 455/450, 455/452.1, 442, 524, 452.02
See application file for complete search history.

(56) References Cited

U.S. PATENT DOCUMENTS

| | | | |
|---|---|---|---|
| 5,896,573 A * | 4/1999 | Yang et al. .............. 455/453 |
| 6,590,879 B1 * | 7/2003 | Huang et al. ............ 370/331 |
| 6,690,938 B1 * | 2/2004 | Chin ........................ 455/450 |
| 6,745,049 B1 | 6/2004 | Uchida et al. |
| 6,871,071 B1 * | 3/2005 | Takao et al. ............. 455/436 |
| 6,889,050 B1 * | 5/2005 | Willars et al. .......... 455/452.2 |
| 2004/0198359 A1 | 10/2004 | Uchida et al. |
| 2005/0213535 A1 | 9/2005 | Uchida et al. |

FOREIGN PATENT DOCUMENTS

| | | |
|---|---|---|
| JP | 2000-217159 | 8/2000 |
| WO | WO99/30442 | 6/1999 |

* cited by examiner

*Primary Examiner*—Fan Tsang
*Assistant Examiner*—Simon Sing
(74) *Attorney, Agent, or Firm*—Katten Muchin Rosenman LLP

(57) ABSTRACT

The present invention relates to a mobile communication system in which variable bandwidths are set in this manner, and a base station controller for setting these variable bandwidths. A base station controller sends a value indicating a requested bandwidth required for a channel of variable bandwidth to a base station. The base station, upon receiving the request, returns a response of an allocatable bandwidth equal to or lower than the requested bandwidth, to the base station controller. The base station controller, upon receiving the response, sets the channel of variable bandwidth between a mobile station and the base station, and between the base station and the base station controller, according to the allocatable bandwidth.

9 Claims, 16 Drawing Sheets

FIG. 2

Subscriber data table

| | |
|---|---|
| Subscriber #1 | Subscriber registration information |
| | Subscriber identification number |
| | Subscriber type |
| | Maximum allowable Sch rate |
| | Maximum allowable hand-off rate |
| Subscriber #2 | Subscriber registration information |
| | Subscriber identification number |
| | Subscriber type |
| | Maximum allowable Sch rate |
| | Maximum allowable hand-off rate |
| ⋮ | ⋮ |
| Subscriber #n | Subscriber registration information |
| | Subscriber identification number |
| | Subscriber type |
| | Maximum allowable Sch rate |
| | Maximum allowable hand-off rate |

FIG. 3

| Call number | Hand-off BTS information | Forward side rate information[kbps] | Reverse side rate information[kbps] |
|---|---|---|---|
| 1 | 0 | 9.6 | 9.6 |
| 2 | 1 | 19.2 | 9.6 |
| ⋮ ~ | ⋮ ~ | ⋮ ~ | ⋮ ~ |
| N | 2 | 153.6 | 153.6 |

(Values in the table are exemplary)

Sch Setting (Forward)

Sch Setting (Reverse)

Sch Setting (Forward) When (Exceeding) Maximum Rate

Sch Setting (Reverse) When Maximum Rate

FIG. 14

Recommended rate database

| Recommended rate | Rank R | Timer |
|---|---|---|
| 9.6kbps | 1 | T1 |
| | 2 | T2 |
| | 3 | T3 |
| | 4 | T4 |
| | 5 | T5 |
| | 6 | T6 |
| 9.6×2kbps | 7 | T7 |
| | 8 | T8 |
| | 9 | T9 |
| | 10 | T10 |
| | 11 | T11 |
| | 12 | T12 |
| ⋮ | ⋮ | ⋮ |

Subscriber#1
Subscriber#6

Subscriber#3
Subscriber#10
Subscriber#38

CHANNEL SETTING METHOD IN MOBILE COMMUNICATION SYSTEM

BACKGROUND OF THE INVENTION

1. Field of the Invention

The present invention relates to a method for setting channels of variable bandwidth in a mobile communication system comprising mobile stations, base stations and a base station controller. Moreover, the present invention also relates to a mobile communication system in which variable bandwidths are set in this manner, and a base station controller for setting these variable bandwidths.

2. Description of the Related Art

In the field of a mobile communication system, for instance, cellular phones, and the like, a cdma2000 (MC-CDMA) system for broadening the bandwidth of a cdmaOne system is coming into practical use.

In addition to the fundamental channel (Fch: Fundamental Channel) in the cdmaone system, the cdma2000 system newly provides a dedicated control channel (DCch) and a supplementary channel (hereinafter, called "Sch"). A communication circuit between the respective mobile stations (cellular phones, car phones, etc.) and the base station and base station controller is constituted by Fch, DCch and Sch.

Fch and DCch are jointly called the traffic channel (hereinafter, "Tch"). This traffic channel Tch is used for both voice communications, and data communications by packet transmission, or the like. The Sch, on the other hand, is used only for packet communication of data, or the like. Moreover, the Fch and DCch included in the Tch are both assigned a fixed size bandwidth (resource, rate). For example, they are assigned a 9.6 kbps bandwidth.

The Sch, on the other hand, can be assigned a bandwidth, (resource, rate) of variable size, it being possible to assign any requested bandwidth that can be guaranteed, below a predetermined maximum value. For example, at 9.6×m [kbps] (where m is a positive integer), a bandwidth up to the predetermined maximum value of 144 [kbps] (in other words, m=15), can be assigned.

If data communications are being performed between a mobile station and the base station, then generally, the Tch (either Fch or DCch) is used first, and if the Tch bandwidth is not sufficient, then the Sch is used as well. In this case, the necessary bandwidth is allocated to the Sch. Therefore, when the mobile station is only performing voice communications, or when it is performing data communications by Tch only, then only Tch is in use and Sch is not set up.

In a current cdma2000 system, the allocation of bandwidth to the Sch is performed equally for each mobile station. In other words, if the requested bandwidth can be guaranteed for each one of the mobile stations, this requested bandwidth is assigned to the Sch of those mobile stations. On the other hand, if the requested bandwidth cannot be guaranteed, then communications are continued using Tch only, without setting the Sch for the mobile stations.

Furthermore, during hand-off performed by a mobile station moving between cells or sectors, if the bandwidth of Sch set between the mobile station and the source side base station cannot be guaranteed between the mobile station and the target side base station, then the Sch between the mobile station and the target base station is not set and no hand-off is implemented for the Sch.

In this way, in the current cdma2000 system, if the bandwidth requested for the Sch cannot be guaranteed, then even if a smaller bandwidth can be guaranteed, that bandwidth is not assigned to the Sch and hence efficient use of the bandwidth (resource) is not achieved.

Furthermore, although the bandwidth usable for the Sch is limited by the maximum value 144 [kbps], any mobile station is assigned directly with the full requested bandwidth as long as the bandwidth is less than this maximum value. Consequently, situations may arise where Sch is set in some of the mobile stations, whilst no Sch at all is set in the remaining mobile stations. This in turn leads to a risk that the appeal of the service will decline.

SUMMARY OF THE INVENTION

The present invention was devised with the foregoing situation in view, an object thereof being to achieve efficient use of channels assigned with a variable bandwidth, such as Sch, in a mobile communication system.

In order to achieve the aforementioned object, the channel setting method according to a first aspect of the present invention is a method for setting a channel of variable bandwidth between a mobile station and a base station performing radio communications with said mobile station, and between said base station and a base station controller communicating with said base station and controlling said base station, comprising the steps of: in said base station controller, sending a request for a bandwidth required for said channel to said base station; in said base station, upon receiving said request, returning a response of an allocatable bandwidth equal to or lower than said required bandwidth, to said base station controller; and in said base station controller, upon receiving said response, setting said channel of variable bandwidth between said mobile station and said base station, and between said base station and said base station controller, according to said allocatable bandwidth.

The base station controller according to the first aspect of the present invention is a base station controller for establishing a channel of variable bandwidth between a mobile station and a base station performing radio communications with said mobile station, and between said base station and said base station controller which communicates with said base station and controls said base station, comprising: a transmitting portion for sending a request for a bandwidth required for said channel to said base station; a receiving portion for receiving a response of an allocatable bandwidth equal to or lower than said requested bandwidth, from said base station; and a channel setting portion for setting said channel of variable bandwidth between said mobile station and said base station, land between said base station and said base station controller, according to said allocatable bandwidth received by said receiving portion.

According to this first aspect of the present invention, even if the bandwidth set for the channel of variable bandwidth cannot be ensured according to the requested bandwidth, a channel is established having a bandwidth that can be ensured. Therefore, it is possible to make efficient use of the bandwidth set for a channel of variable bandwidth.

The channel setting method according to a second aspect of the present invention is a channel setting method in a mobile communication system in which a first channel of fixed bandwidth, and a second channel of variable bandwidth established according to requirements, are set up between a mobile station and a plurality of base stations performing radio communications with said mobile station, and between said plurality of base stations and a base station controller which communicates with said plurality of base stations and controls said base stations, said channel setting method being a method for setting said second channel during hand-off where said mobile station is communicating with said plurality of base stations by means of said first channel, and comprising the steps of: in said base station controller, sending a request for a bandwidth required for said second channel to said plurality of base stations communicating by means of said first channel; in said plurality of base stations, upon receiving said request, returning a response of an allocatable bandwidth equal to or lower than said requested bandwidth, to said base station controller; and in said base station controller, upon receiving said responses, setting said second channels between said mobile station and said plurality of base stations, and between said plurality of base stations and said base station controller, according to the smallest bandwidth of said plurality of allocatable bandwidths.

According to the second aspect of the present invention, even if there is a disparity in the bandwidths of the second channels which can be ensured for a plurality of base stations, the smallest bandwidth of these different bandwidths is ensured. Consequently, hand-off is performed with respect to the second channel also. Thereby, it is possible to make efficient use of the second channel bandwidth.

The channel setting method according to a third aspect of the present invention is a channel setting method in a mobile communication system in which a first channel of fixed bandwidth, and a second channel of variable bandwidth established according to requirements, are set up between a mobile station and a first and a second base station performing radio communications with said mobile station, and between said first and second base stations and a base station controller which communicates with said base stations and controls said base stations, said channel setting method being a method for setting said second channel between said mobile station and said second base station at the start of handoff where said mobile station starts to communicate simultaneously with said second base station whilst also communicating with said first base station by means of said first and second channel, and comprising the steps of: in said base station controller, sending a request for a bandwidth required for said second channel to said second base station; in said second base station, upon receiving said request, returning a response of an allocatable bandwidth equal to or lower than said requested bandwidth, to said base station controller; and in said base station controller, upon receiving said response from said second base station, comparing said allocatable bandwidth with the bandwidth of the second channel established to said first base station; and in a case where the former bandwidth is lower than the latter bandwidth, changing the bandwidth of the second channel established to said first base station to the former bandwidth, and also establishing said second channel between said mobile station and said second base station, and between said second base station and said base station controller, in accordance with said former bandwidth.

According to this third aspect of the present invention, the bandwidth of the second channel already established to the first base station is changed to a bandwidth matching that of the second channel that is to be ensured to the second base station. Therefore, even if the bandwidth between the first base station and the mobile station does not match the bandwidth between the second base station and the mobile station, a second channel can still be ensured and hand-off performed. Thereby, it is possible to make efficient use of the bandwidth of the second channel.

The channel setting method according to a fourth aspect of the present invention is a method for setting a channel of variable bandwidth between a mobile station and a base station performing radio communications with said mobile station, and between said base station and a base station controller which communicates with said base station and controls said base station, said method being performed under control of said base station controller, and comprising the steps of: holding a bandwidth allocation priority for said mobile station and a recommended bandwidth set and recommended with respect to said priority; setting said channel by comparing said recommended bandwidth with a requested bandwidth for said channel; if the smaller bandwidth thereof can be ensured, ensuring said smaller bandwidth; and if said smaller bandwidth cannot be ensured, reducing the bandwidth of a channel established to another mobile station of lower rank of said priority than the mobile station for which said smaller bandwidth is being ensured, and ensuring said smaller bandwidth.

According to this fourth aspect of the present invention, bandwidth can be allocated according to the priority ranking of a mobile station, and hence preferential allocation is performed. Therefore, the appeal of the service is improved.

BRIEF DESCRIPTION OF THE DRAWINGS

FIG. 2 shows a subscriber data table belonging to a BSC;

FIG. 3 shows rate management information belonging to a BSC;

FIG. 14 shows one example of the structure of a recommended rate database; and

DESCRIPTION OF THE PREFERRED EMBODIMENTS

1. System Configuration

Figure 1:
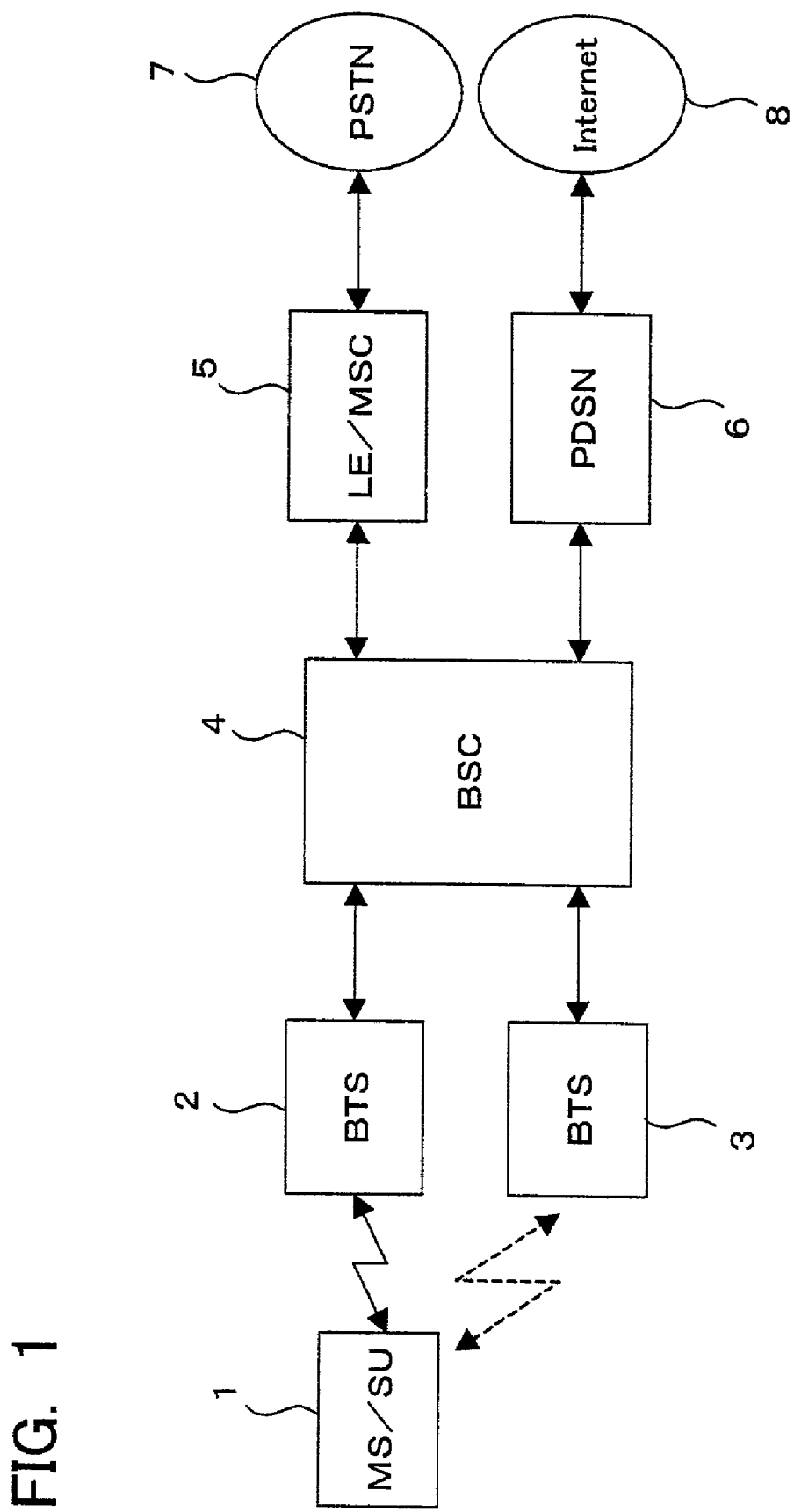
FIG. 1 is a block diagram showing the composition of a communication system adopting a cdma2000 method.

FIG. 1 is a block diagram showing the composition of a communication system adopting a cdma2000 method.

This communication system comprises: a mobile station (MS/SU: Mobile Station/Subscriber Unit) 1 such as a cellular phone, car phone, or the like; base stations (BTS: Base Station Transceiver Subsystem) 2 and 3; a base station controller (BSC) 4; an exchange (LE/MSC: Local Exchange / Mobile Switching Center) 5; and a packet data service node (PDSN Packet Data Service Node) 6.

The LE/MSC 5 is connected to the BSC 4 and a public telephone network (PSTN: Public Switched Telephone Network) 7, and performs call exchange processing between the BSC 4 and the PSTN 7. The LE/MSC 5 may also be connected to other BSC (not illustrated) and other mobile communications networks (not illustrated).

The PDSN 6 is connected to the BSC 4 and the Internet 8, and performs call exchange processing between the BSC 4 and the Internet 8. The PDSN 6 may also be connected to other BSC (not illustrated) and other mobile station networks (not illustrated).

The BTS 2 and 3 are respectively located in two adjoining jurisdiction sectors A and B. MS/SU 1 communicates with BTS 2 when it is situated within the jurisdiction sector A of BTS 2, and it communicates with BTS 3 when it is situated within the jurisdiction sector B of BTS 3. Moreover, there is an overlapping region (boundary region) between jurisdictions sectors A and B, and when the MS/SU 1 is situated within this boundary region, a hand-off operation is performed, and during hand-off, the MS/SU 1 communicates with both BTS 2 and 3.

BTS 2 has empty rate volume information indicating how much usable bandwidth is currently available of the bandwidth hereinafter, also referred to as "resources", "communication rate" or "rate") of the supplemental channel (Sch). The empty rate volume information contains forward direction Sch rate information from the BTS 2 to the MS/SU 1, and reverse direction Sch empty rate information from the MS/SU 1 to the BTS 2. BTS 3 also has similar Sch empty rate volume information.

As well as controlling the BTS 2 and 3 and storing the communication history of each MS/SU 1, the BSC 4 also performs settings, halt and bandwidth modification processing, and the like, for the forward direction and reverse direction traffic channels (Tch) and Sch between MS/SU 1 and the BSC 4 via the BTS 2 or 3. This settings, halt, and bandwidth modification processing, and the like, performed on Tch and Sch, is described in more detail hereinafter.

The Tch is constituted by a fundamental channel (Fch) and a dedicated control channel (DCch). In the present embodiment, the Fch is assigned a fixed bandwidth of 9.6 [kbps] in both the forward direction and the reverse direction. The same applies to DCch. On the other hand, in the present embodiment, Sch is assigned a variable bandwidth of 9.6 [kbps]×m (where m is an integer between 1 and 15, inclusive), in both the forward and reverse directions.

If the MS/SU 1 is communicating data (for example, text data, image data, or the like) other than voice data, then the Tch (either Tch or DCch) is used preferentially. If the volume of communication data is large and Tch (namely, 9.6 [kbps]) is not sufficient, then Sch is used in addition to Tch.

Furthermore, the BSC 4 is also provided with a subscriber data table containing data for each subscriber (each MS/SU 1), and rate management information.

FIG. 2 shows a subscriber data table belonging to BSC 4. Each subscriber data entry consists of: subscriber registration information, a subscriber identification number, subscriber type, maximum allowable Sch rate, and maximum allowable hand-off rate.

The subscriber registration information indicates whether or not registration data exists (empty/registered). The subscriber identification number is a number for uniquely identifying the subscriber, for instance, a telephone number, ESN, IMSI number, or the like. The subscriber type indicates the category of the subscriber, these categories including: general, VIP, common, fixed, and mobile.

The maximum allowable Sch rate is the maximum rate of the Sch allowed for that subscriber. As described hereinafter, when the BSC 4 sets up the Sch, the requested bandwidth for the set Sch is commanded (requested). The BSC 4 compares this requested bandwidth with the maximum allowable Sch rate, and sets up the Sch having a bandwidth equal to whichever is the smaller of the requested bandwidth and the maximum allowable Sch rate.

The maximum allowable hand-off rate is the maximum hand-off rate allowed by a connection, and when the MS/SU 1 performs hand-off, this rate is compared to the hand-off rate of the whole system.

The hand-off rate of the whole system is calculated by:

$$\text{(Number of subscribers performing hand-off)} \div \text{(number of subscribers in communication)} \quad (1)$$

If a particular subscriber (in other words, MS/SU 1) seeks to perform hand-off, the BSC 4 calculates the hand-off rate for the whole system at that point in time, using equation (1) above, and it then compares the calculated hand-off rate with the maximum allowable hand-off rate of the MS/SU 1 seeking to perform hand-off. If the former rate is greater than the latter, the BSC 4 does not permit hand-off to MS/SU 1.

FIG. 3 shows rate management information belonging to BSC 4. The rate management information comprises: a call number, hand-off BTS information, forward side rate information, and reverse side rate information.

The "call number" is a unique number assigned by the BSC 4 each time a MS/SU 1 initiates a communication, and there is a one-to-one correspondence between call numbers and MS/SU 1 units. Therefore, a MS/SU 1 can be identified uniquely by means of this call number.

The "hand-off BTS information" indicates the hand-off state of the MS/SU 1, and is set to 0 if the MS/SU 1 is not in a hand-off state, in other words, if it is only communicating with one BTS (hereinafter, this is also referred to as a "one-way state"). This information is set to 1, if the MS/SU 1 is performing hand-off between two BTS (for example, BTSs 2 and 3) (hereinafter, this is also referred to as a "two-way state"). Moreover, if the MS/SU 1 is situated in a boundary region between three BTSs and is in a state of performing hand-off between three BTSs (hereinafter, this is also referred to as a "three-way state"), then this hand-off BTS information is set to 2. Thereafter, similarly, in the case of 4 or more BTSs, values of 3 and above are respectively specified.

The "forward side rate information" indicates the total bandwidth of Tch and Sch in the forward direction for each MS/SU 1 that has been set up. The "reverse side rate information" indicates the total bandwidth of Tch and Sch in the reverse direction for each MS/SU 1 that has been set up. Therefore, if the "forward side rate information" has a value of 9.6 [kbps], then this signifies that only the Tch has been set. Moreover, if the "forward side rate information" has a value of 19.2 [kbps], then this signifies that a 9.6 [kbps] Tch and a 9.6 [kbps] Sch have been set up. The same applies to reverse side rate information.

Next, the process of setting up Sch in the MS/SU 1, BTSs 2 and 3, and BSC 4, will be described in three different situations: in a state other than a hand-off state (in other words, when neither setting up hand-off, nor performing hand-off); when setting up hand-off; and when performing hand-off.

Figure 4:
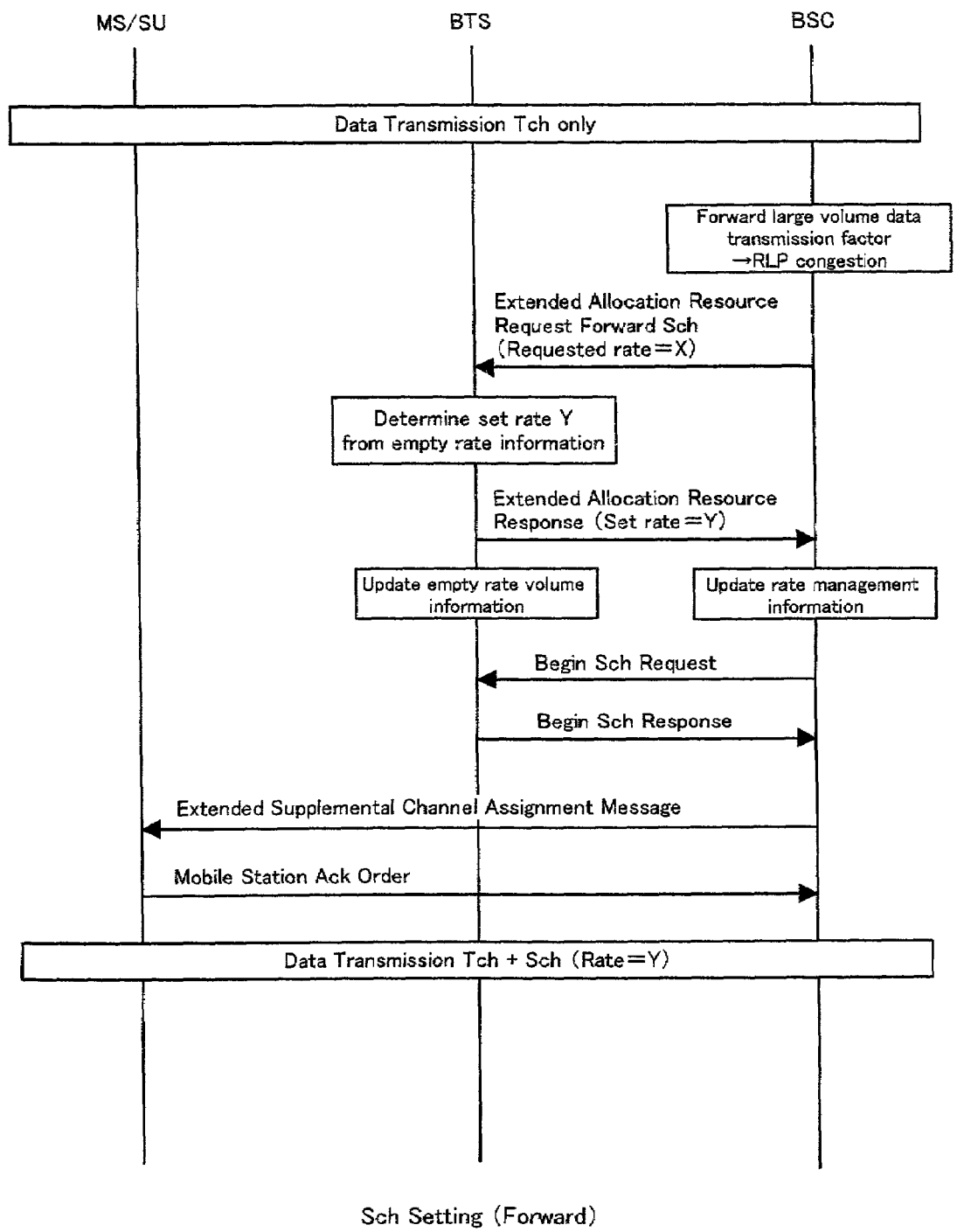
FIG. 4 is a sequence diagram showing the flow of forward direction Sch setup processing in non-hand-off states.

2. Sch setup processing in non-hand-off states 2.1 Forward direction Sch setup processing FIG. 4 is a sequence diagram showing the flow of forward direction Sch setup processing in non-hand-off states (in other words, when neither setting up hand-off, nor performing hand-off).

When transmitting data in a forward direction from the BSC 4 to the MS/SU 1 via the BTS 2 by means of Tch, if a large-volume data transmission factor arises in the forward direction in the BSC 4, and as a result, congestion occurs in the radio link protocol (RLP), then the BSC 4 judges that it is necessary to set up the Sch. Here, for example, congestion is judged to have arisen or not arisen in the RLP according to whether or not the amount of accumulated communication data per unit time in the BSC 4 exceeds a previously determined threshold value. If it does exceed this threshold, then congestion is judged to have arisen, and if it does not exceed this threshold, then congestion is not judged to have arisen.

The BSC 4 then sends a resource (bandwidth) allocation request (Extended Allocation Resource Request) for the forward direction Sch (F-Sch), to the BTS 2. This resource allocation request contains a requested rate X [bps] that is to be allocated to F-Sch.

With respect to the requested rate X, the BTS 2 consults the empty rate volume information, and determines the rate Y [bps] ($<=X$) that can be set. The BTS 2 sends back a resource allocation response (Extended Allocation Resource Response) containing the set rate Y [bps], to the BSC 4. Thereby, the bandwidth Y for the F-Sch is ensured.

Here, in the present embodiment, X and Y take values which are a factor m of 9.6 k[bps] (where m is an integer between 1 and 15, inclusive). Moreover, since $Y<=X$, then if a set rate Y can be ensured in accordance with the requested rate X, X=Y, and if a set rate Y cannot be ensured in line with the requested rate, then Y<X.

Thereupon, the BTS 2 updates the forward direction empty rate information (in other words, it subtracts the set rate Y from the forward direction empty rate volume information). The BSC 4 updates the rate management information (in other words, it adds the set rate Y to the forward rate information for the call number corresponding to the MS/SU 1 to which the F-Sch has been setup).

Thereupon, the BSC 4 transmits an Sch begin request (Begin Sch Request) at setup rate Y [bps] to the BTS2, and in response, the BTS,2 sends back an Sch begin response (Begin Sch response) to the BSC 4.

Next, the BSC 4 transmits a supplementary channel assignment message (Extended Supplemental Channel Assignment Message) to the MS/SU 1 via the BTS 2, and in response to this, the MS/SU 1 sends back a mobile station acknowledgement order (Mobile Station Ack Order), to the BSC 4, via the BTS 2.

Thereupon, an F-Sch having the set rate Y is set up from the BSC 4 via the BTS 2 to MS/SU 1, and forward direction data transmission is performed by means of F-Sch.

In this way, even if the set rate Y that can be set up by the BTS 2 is lower than the requested rate X, since a settable rate Y is assigned to the Sch, it is possible to achieve efficient use of the Sch resources.

Moreover, if the empty rate volume information at BTS 2 is zero, then in response to the resource allocation request from BSC 4, the BTS 2 will send back an NG (Sch not settable) message. In this case, F-Sch is not set up and communications are conducted via the Tch only.

2.2 Reverse direction Sch setup processing

Figure 5:
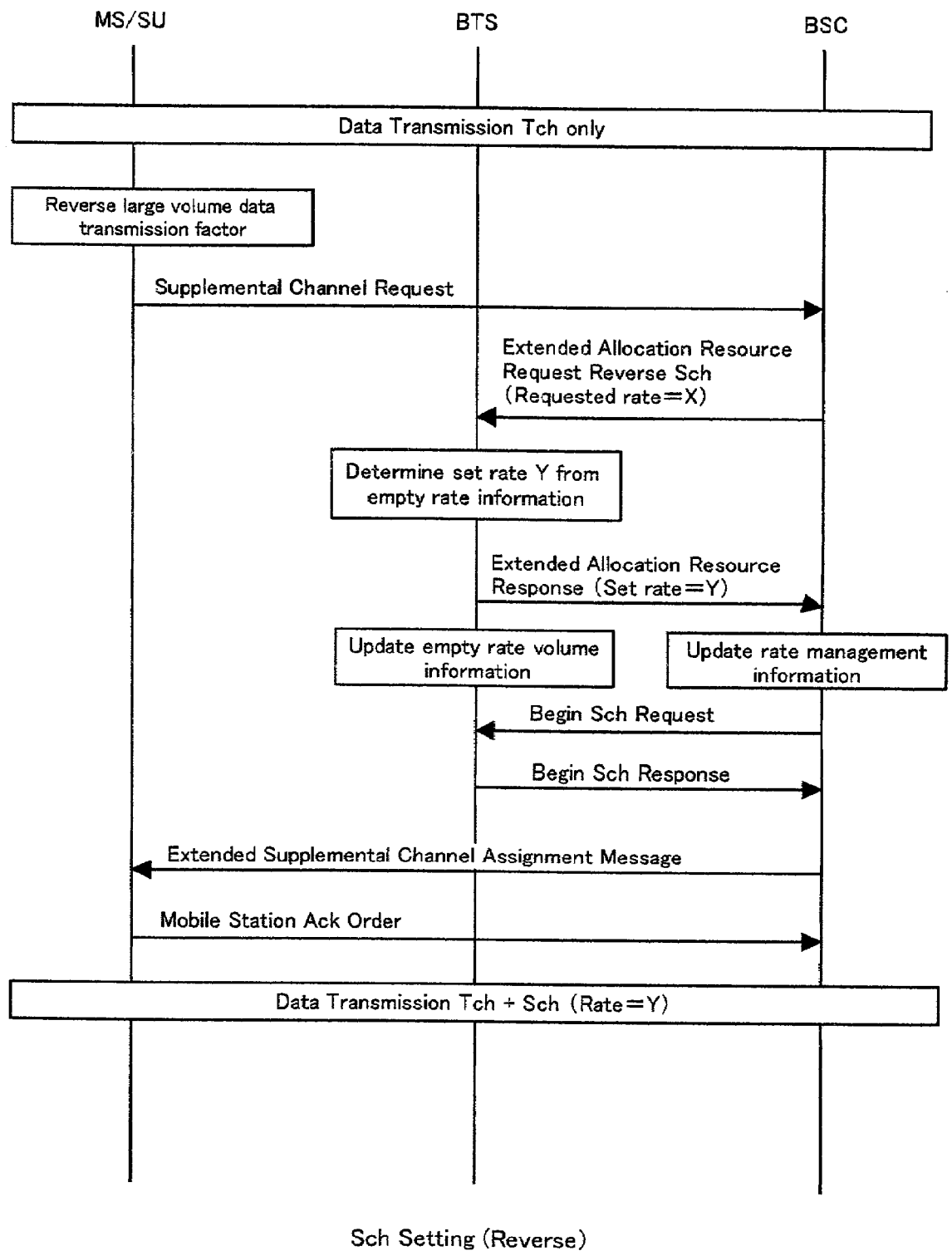
FIG. 5 is a sequence diagram showing the flow of reverse direction Sch setup processing in a non-hand-off state.

FIG. 5 is a sequence diagram showing the flow of reverse direction Sch setup processing in a non-hand-off state.

During data transmission in the reverse direction from the MS/SU 1 to the BSC 4 via the BTS 2 by means of Tch, if a large volume data transmission factor in the reverse direction occurs in the MS/SU 1, and it is necessary to set up a reverse direction Sch (R-Sch), then the MS/SU 1 will transmit an supplementary channel request (Supplemental Channel Request) to the BSC 4 via the BTS 2.

In response, the BSC 4 sends the BTS 2 an Sch resource (bandwidth) allocation request for a requested rate X in the reverse direction.

With respect to the requested rate X, if the BTS 2 is able to set a rate Y ($<=X$), depending on the empty rate volume information, then it sends the BSC 4 a resource allocation response for setting up a communications rate at the set rate Y. Thereby, the bandwidth Y is ensured for R-Sch.

Thereupon, the BTS 2 updates the reverse direction empty rate volume information (in other words, it subtracts the set rate Y from the reverse direction empty rate volume information). BSC 4 updates the rate management information (in other words, it adds the set rate Y to the reverse rate information for the call number corresponding to the MS/SU 1 to which R-Sch has been set up).

The BSC 4 then sends an Sch begin request to the BTS 2, and in response to this, the BTS 2 sends back an Sch begin response.

Thereupon, the BSC 4 sends a supplementary channel allocation message via the BTS 2 to the MS/SU 1, and in response, the MS/SU 1 sends back a mobile station back order via the BTS 2 to the BSC 4.

Next, an R-Sch of set rate Y is established from the MS/SU 1 via the BTS 2 to the BSC 4, and reverse direction data transmission is conducted by means of R-Sch in addition to Tch.

In this way, even if the set rate Y that can be established by the BTS 2 is lower than the requested rate X, the settable rate Y is allocated, and therefore it is possible to make efficient use of Sch resources.

If the empty rate volume information in BTS 2 is zero, then the BTS 2 sends the BSC 4 a NG (Sch not settable) message in response to the resource allocation request from the BSC 4. In this case, R-Sch is not set and communications are continued by means of Tch only.

2.3 Sch setup processing when maximum allowable rate is exceeded

Figure 6:
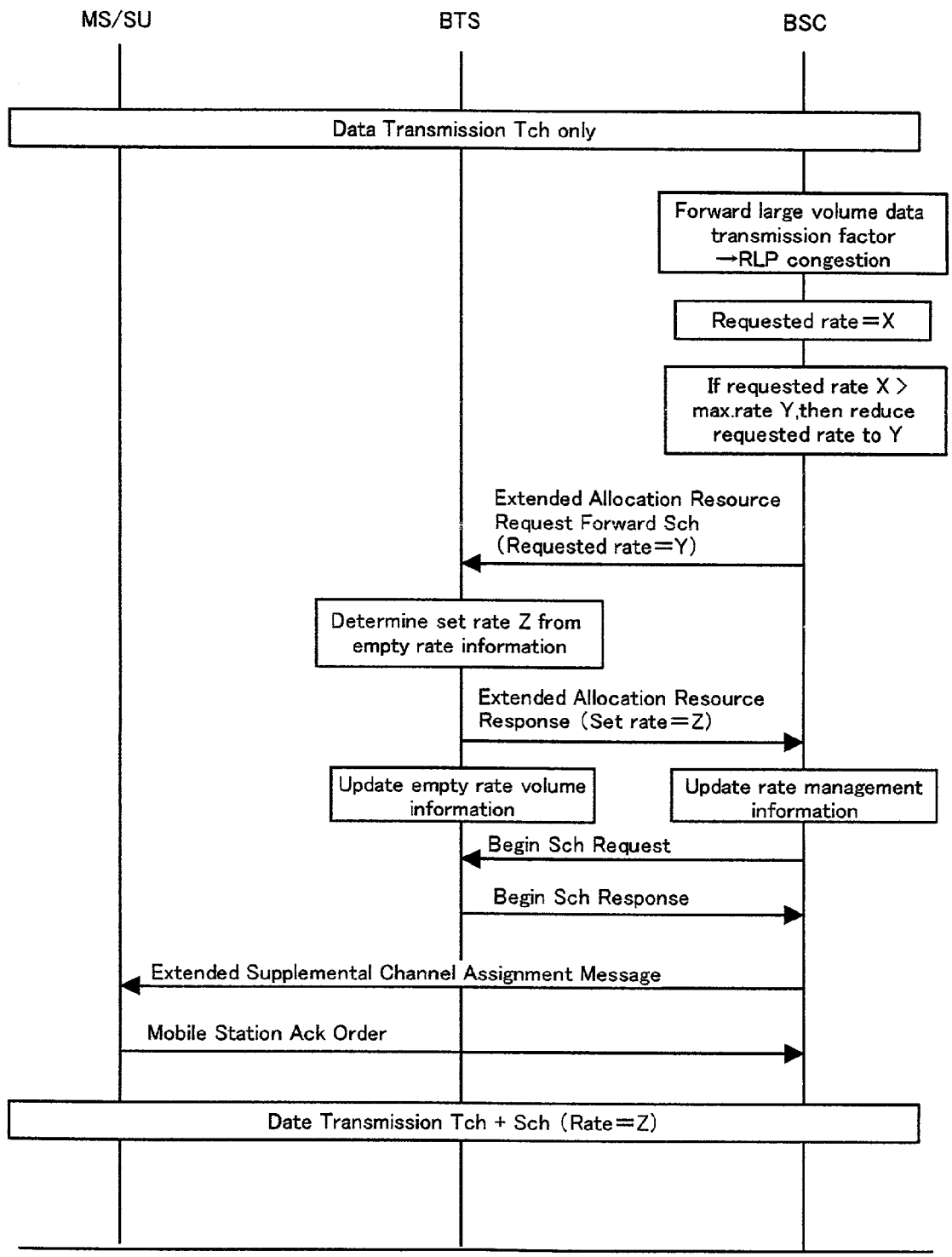
FIG. 6 is a sequence diagram of a case where the requested rate for F-Sch at the BSC is greater than the maximum allowable Sch rate in the subscriber data table shown in FIG. 2.
Figure 7:
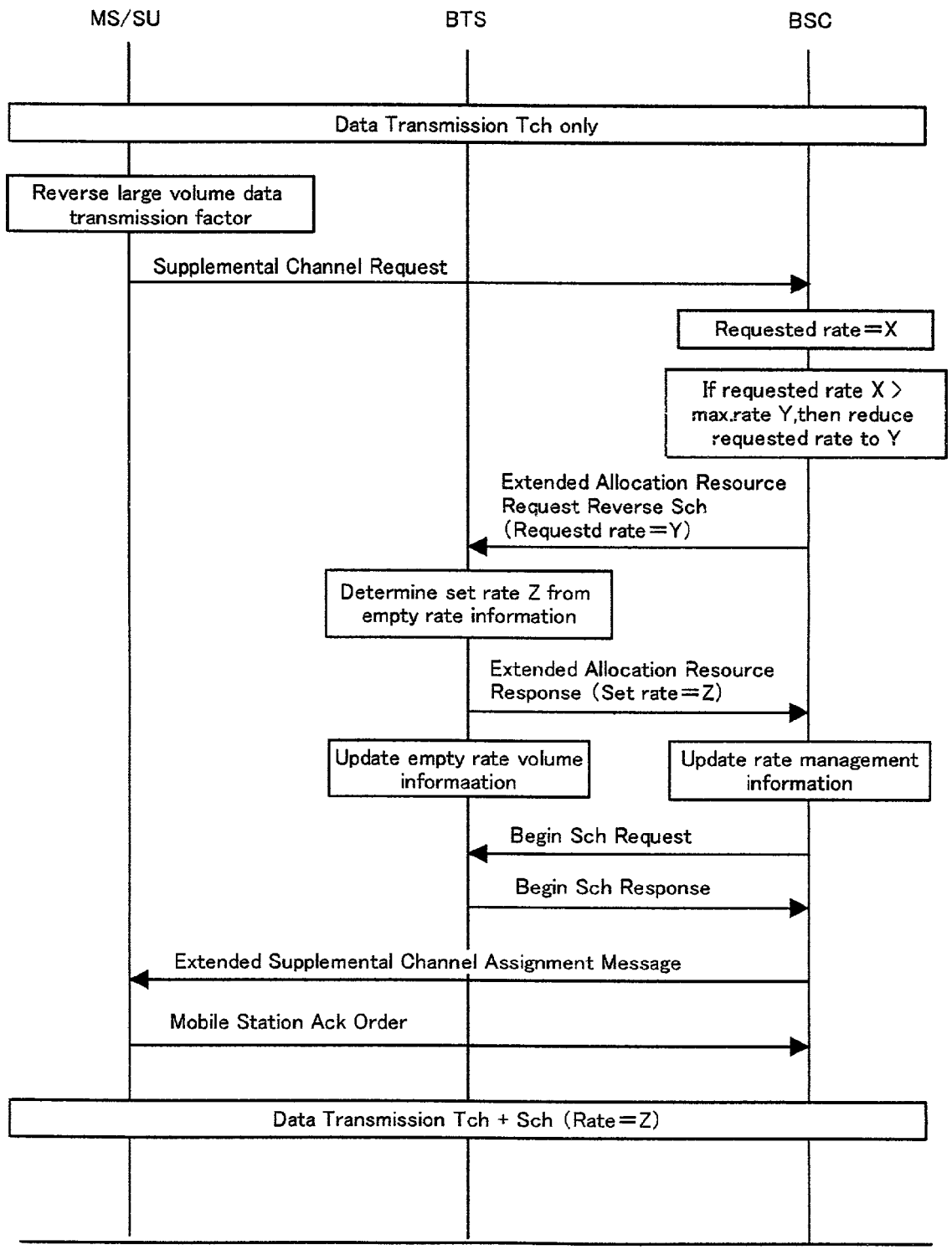
FIG. 7 is a sequence diagram of a case where the requested rate for R-Sch at the BSC is greater than the maximum allowable Sch rate in the subscriber data table shown in FIG. 2.

FIG. 6 is a sequence diagram of a case where the requested rate for F-Sch at the BSC 4 is greater than the maximum allowable Sch rate in the subscriber data table shown in FIG. 2. FIG. 7 is a sequence diagram of a case where the requested rate for R-Sch at the BSC 4 is greater than the maximum allowable Sch rate in the subscriber data table shown in FIG. 2.

If the requested rate X for F-Sch or R-Sch is greater than the maximum allowable Sch rate Y, then the requested rate X is reduced to the maximum allowable Sch rate Y, and an Sch resource allocation request is issued to the BTS 2 using this requested rate Y.

The processing thereafter is similar to that in FIG. 4 and FIG. 5 described above. Consequently, further description thereof is omitted here.

In this way, the rate requested by a subscriber seeking an Sch is compared with the maximum allowable Sch rate for that subscriber, and if the requested rate exceeds the maximum allowable Sch rate, then the Sch is set to this maximum allowable Sch rate. It is therefore possible to prevent situations occurring wherein, for instance, an Sch having a large bandwidth is allocated to a particular subscriber only, whilst no Sch is allocated to other subscribers, and in this way, efficient Sch use is achieved.

3. Sch setup processing during hand-off setting (initiation)

3.1 Forward direction Sch setup processing

Figure 8:
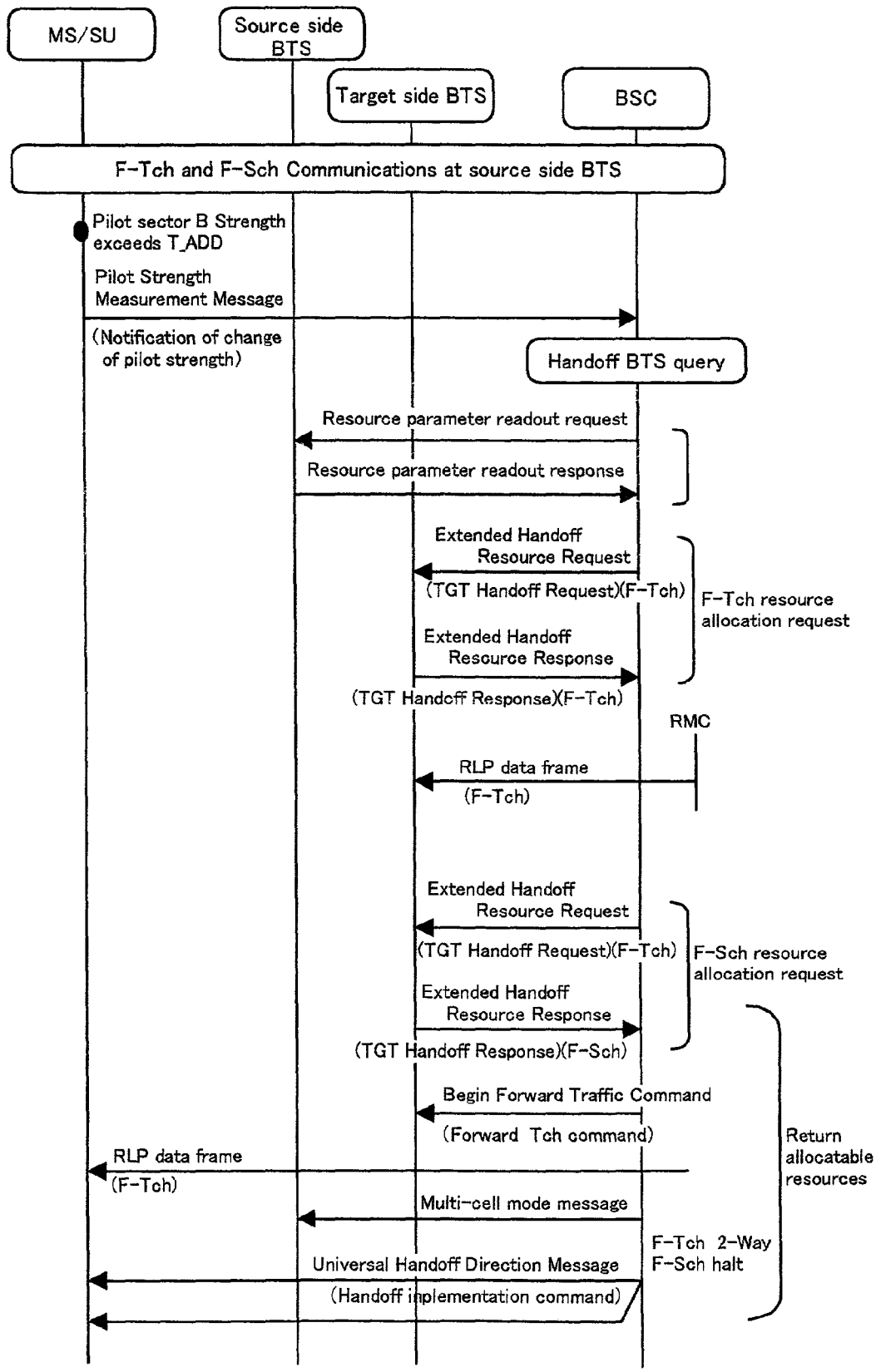
FIGS. 8 and 9 are sequence diagrams showing the flow of forward direction Sch setup processing during hand-off setting (initiation)
Figure 9:
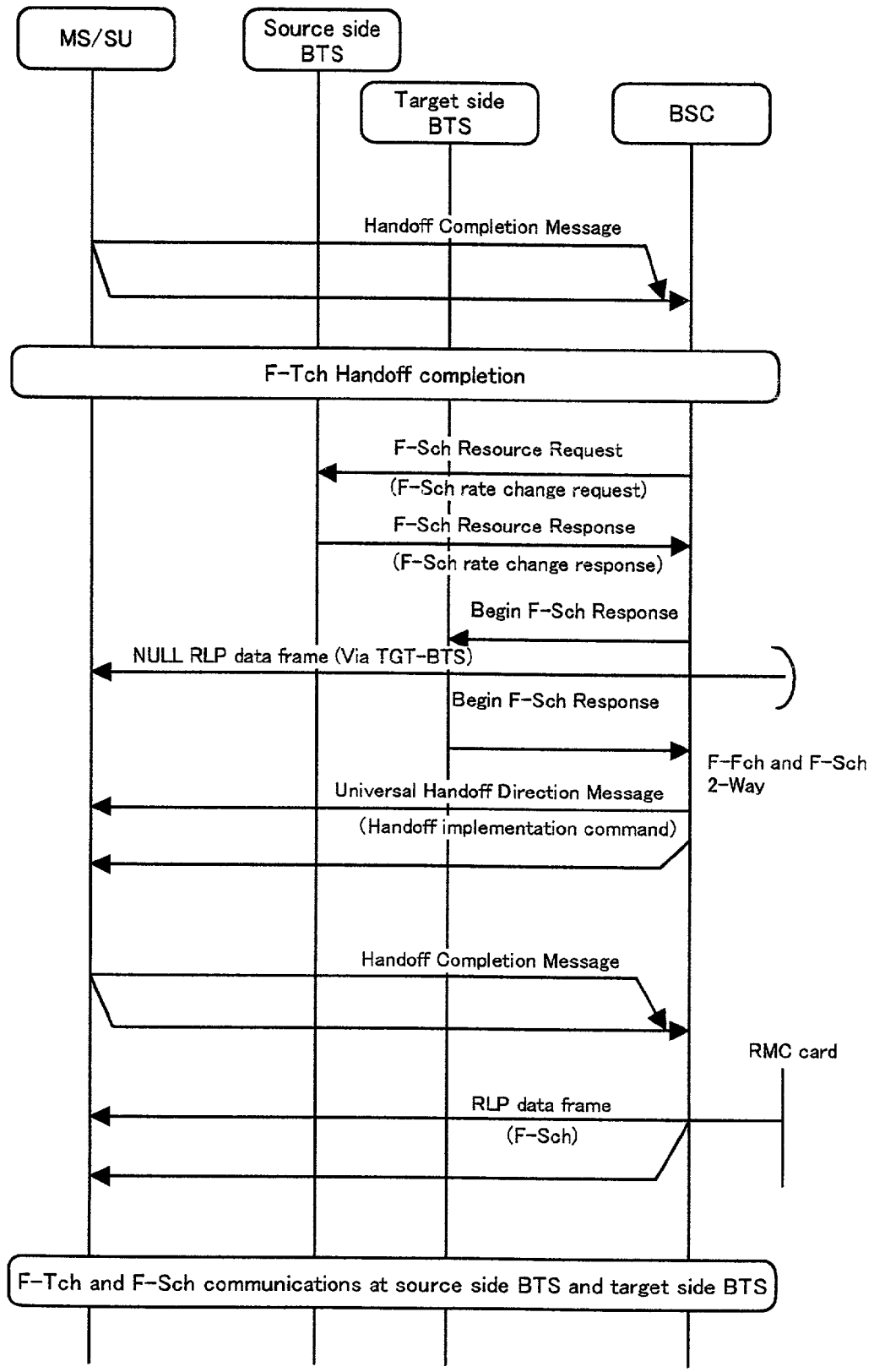

FIG. 8 and FIG. 9 are sequence diagrams showing the flow of forward direction Sch setup processing during hand-off setting (initiation). FIG. 9 shows a continuation of FIG. 8.

Here, hand-off is described in relation to a case where the MS/SU 1 is in the jurisdiction sector A of BTS 2 and is communicating with BTS 2 by means of a forward Tch (F-Tch) and a forward Sch (F-Sch), whereupon the MS/SU 1 moves into a boundary region between jurisdiction sector A and jurisdiction sector B (jurisdiction sector of BTS 3). Therefore, here, BTS 2 forms the source side BTS and BTS 3 forms the target side BTS.

When the MS/SU 1 enters into the boundary region, the strength of the pilot signal it receives from BTS 3 (Pilot Sector B Strength) exceeds a previously determined threshold value T#ADD. Thereby, the MS/SU 1 sends a pilot strength measurement message to the BSC 4, via the BTS 2.

Upon receiving this pilot strength measurement message, the BSC 4 determines whether or not to permit hand-off, on the basis of the maximum hand-off rate contained in the subscriber data of the MS/SU 1 sending this message, and the most recent hand-off rate for the whole system (hand-off BTS inquiry).

If the maximum hand-off rate contained in the subscriber data is less than the most recent hand-off rate for the whole system, then the BSC 4 ignores the pilot strength measurement message and does not perform hand-off. If, on the other hand, the maximum hand-off rate contained in the subscriber data is greater than or equal to the most recent hand-off rate for the whole system, then the BSC 4 implements the following hand-off processing.

Specifically, the BSC 4 sends a resource parameter read-out request to the source side BTS 2, to request the set rate of the currently established F-Sch. In response, the source side BTS 2 sends a resource parameter read-out response to the BSC 4 to report the F-Sch set rate to the BSC 4.

Thereupon, the BSC 4 tests the F-Tch settings with the target side BTS 3. In other words, the BSC 4 sends a target (TGT) hand-off resource request (Extended Handoff Resource Request) regarding F-Tch, to the target side BTS 3. In response to this, the target side BTS 3, returns a TGT hand-off resource response (Extended Handoff Resource Response) regarding F-Tch, to the BSC 4, indicating that a Tch is settable.

The BSC 4 then sends RLP data frames to the target side BTS 3, by means of the established F-Tch.

Next, the BSC 4 sets up an F-Sch with the target side BTS 3. Specifically, the BSC 4 sends a hand-off resource request for F-Sch to the target side BTS 3. This request contains an Sch set rate (requested rate) X obtained from the source side BTS 2 by means of the aforementioned resource parameter read-out request and a corresponding response.

In reply, the BTS 3 sends the BSC 4 a hand-off resource response regarding F-Sch. This response contains the settable rate Y (<=X). Thereupon, although omitted from this diagram, the target side BTS 3 updates the empty rate volume information, and the BSC 4 updates the rate management information, as illustrated in FIG. 4 to FIG. 7 described previously.

Here, if Y<X, namely, if the F-Sch to the BTS 3 can only be set to a rate Y which is lower than the requested rate X, then the previously established F-Sch to the source side BTS 2 is temporarily suspended, and F-Tch is established with the target side BTS 3. Thereby, hand-off by means of F-Tch only is initiated. Thereupon, an F-Sch having the set rate Y is newly established between the MS/SU 1 and both the source side BTS 2 and the target side BTS 3, whereby hand-off by means of F-Sch is initiated. In other words, the F-Sch set to the source side BTS 2 is reduced from the original communications rate X to the new communications rate Y. A more specific description of this processing is given below.

The BSC 4 sends a forward Tch start command (Begin Forward Traffic Command) to the target side BTS 3, and then transmits RLP data frames to the MS/SU 1 via the target side BTS 3.

The BSC 4 then sends a multi-cell-mode communication to the source side BTS 2. This multi-cell-mode notification is a message informing the source side BTS 2 that hand-off is being implemented for the F-Tch, and that the MS/SU 1 is in a 2-way state with the source side BTS 2 and the target side BTS 3.

The BSC 4 then sends the MS/SU 1 a hand-off implementation command notification (Universal Handoff Direction Message), via the source side BTS 2 and the target side BTS 3. This message indicates that the F-Tch is in a two-way state, whilst the F-Sch has been terminated.

Thereby, the MS/SU 1 obtains an F-Tch with the target side BTS 3, as well as with the source side BTS 2, and it sends a handoff completion notification (Handoff Completion Message), to the BSC 4 via the source side BTS 2. Thereupon, communications are performed by means of the F-Tch between the MS/SU 1, source side BTS 2, target side BTS 3 and the BSC 4.

Next, the temporarily suspended F-Sch is restarted. Firstly, the BSC 4 sends an F-Sch change request (F-Sch Resource Request) to the source side BTS 2. This request contains the set rate Y. In response to this, the source side BTS 2 sends back an F-Sch change response (F-Sch Resource Response) to the BSC 4. Thereby, the F-Sch rate to the source side BTS 2 is changed from the original rate X to the new rate Y.

The BSC 4 then sends an Sch start request to the target side BTS 3. This request contains the set rate Y. In response, the target side BTS 3 sends an F-Sch start request to the BSC 4. During this, NULL#RLP data is transmitted from the RMC card to the MS/SU 1, via the target BTS 3. Thereby, an F-Sch is established to the target side BTS 3.

The BSC 4 then sends a handoff implementation command notification (Universal Handoff Direction Message) to the MS/SU 1, via the source side BTS 2 and the target side, BTS 3. This message indicates that the F-Sch is in a two-way state.

Thereupon, RLP data frames are sent from the RMC card via the source side BTS 2 and the target side BTS 3 to the MS/SU 1, by means of F-Sch.

Communications are then performed by means of both F-Tch and F-Sch, between the MS/SU 1, source side BTS 2, target side BTS 3 and the BSC 4, and hand-off is implemented on both F-Tch and F-Sch.

In this way, even if it is only possible to ensure an F-Sch for the target side BTS 3 which has a smaller bandwidth than that of the source side BTS 2, hand-off is still implemented by matching the bandwidth of F-Sch of the source side BTS 2 with the bandwidth of the F-Sch of the target side BTS 3. Thereby, efficient Sch use can be achieved during hand-off.

Moreover, if the requested rate X can be obtained for the target side BTS 3, in the event of the TGT hand-off request (Extended Handoff Resource Request), then an F-Sch of the set rate X can be established with the target side BTS 3, without having to suspend temporarily the F-Sch to the source side BTS 2. Additionally, if the F-Sch bandwidth cannot be guaranteed at the target side BTS 3, in the event of a TGT hand-off request, then hand-off involving F-Sch is not performed, and hand-off by means of F-Tch only is implemented.

3.2 Reverse direction Sch setup processing

Figure 10:
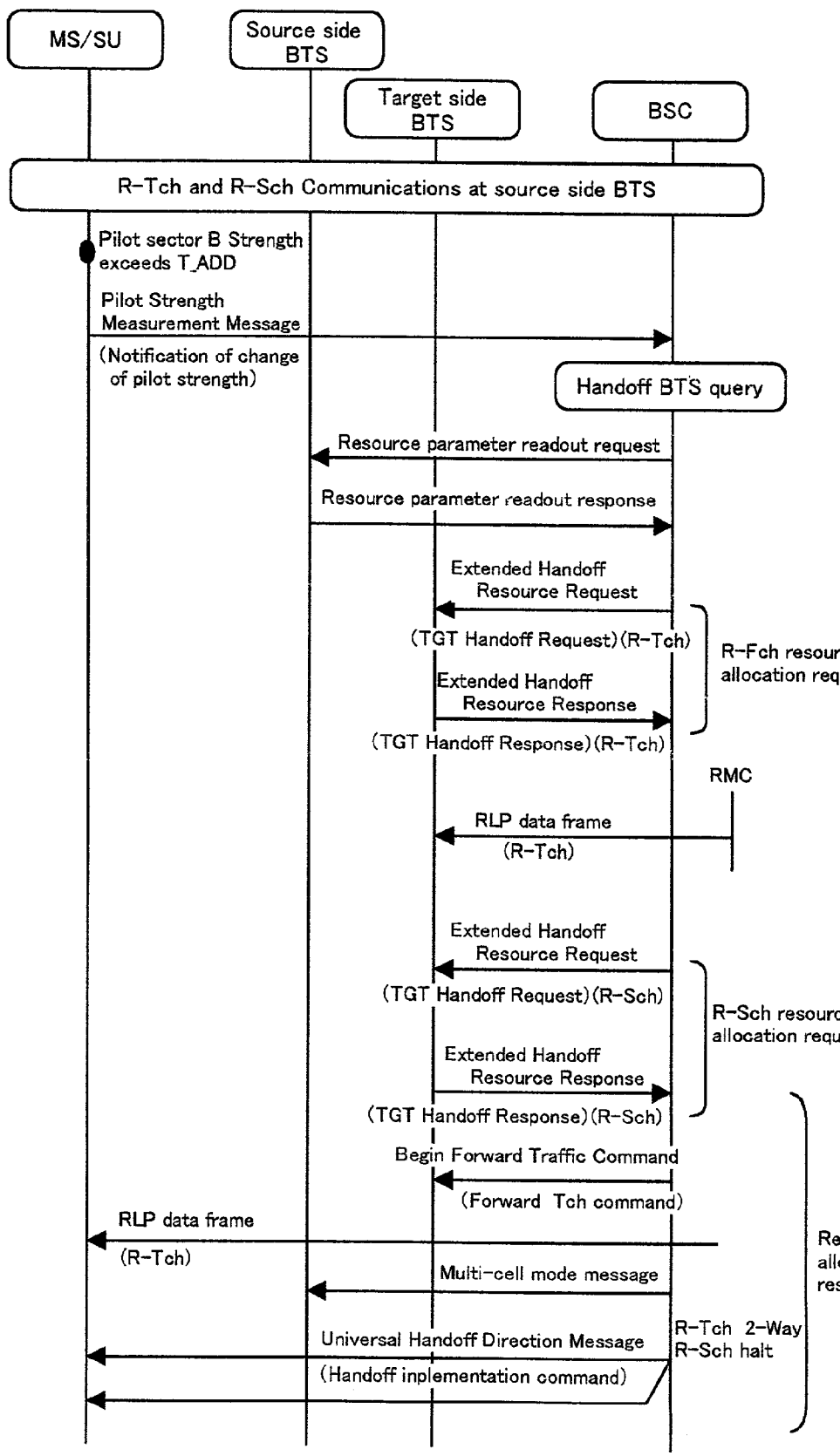
FIGS. 10 and 11 are sequence diagrams showing the flow of setup processing for a reverse direction Sch during hand-off setting (initiation)
Figure 11:
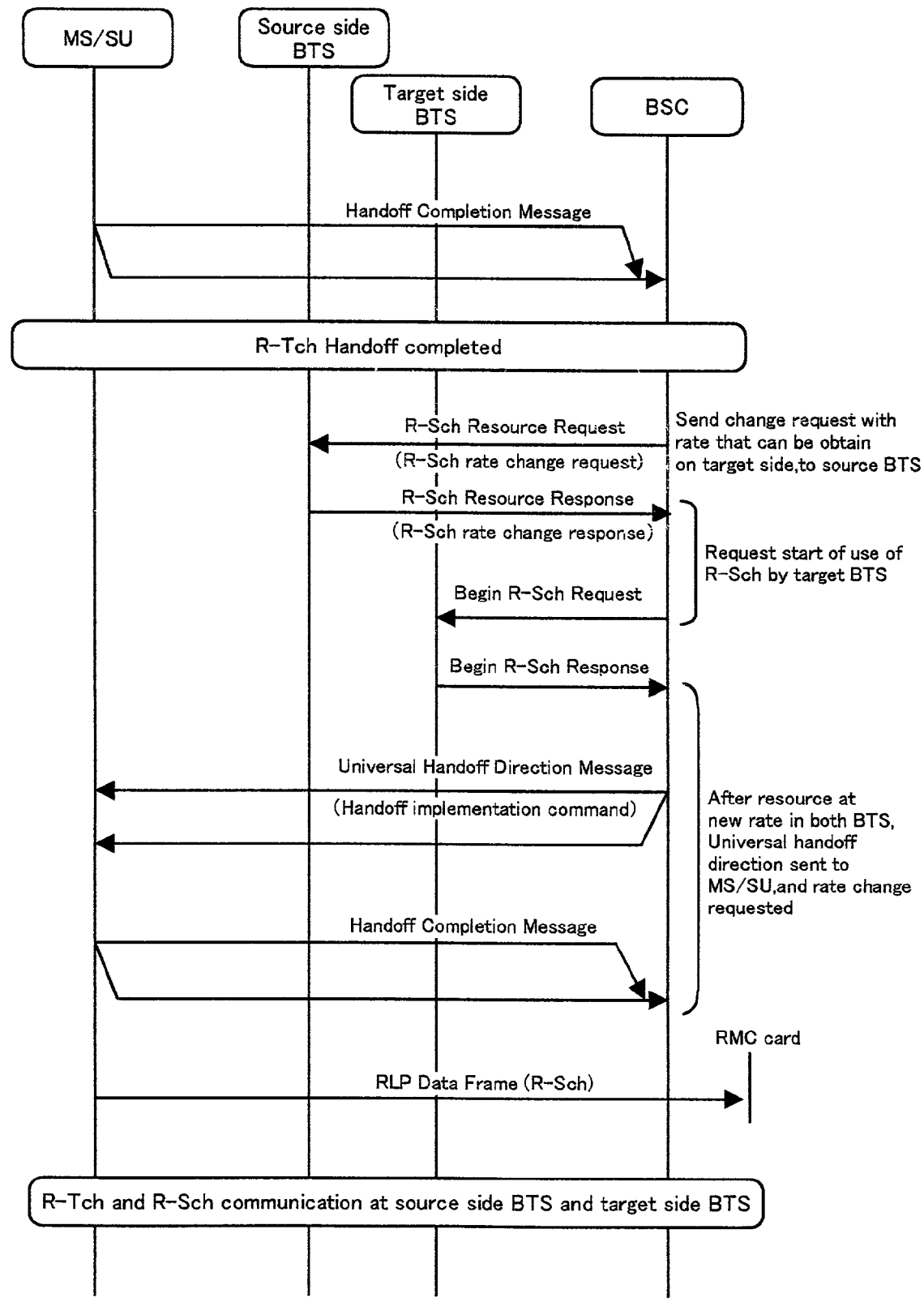

FIG. 10 and FIG. 11 are sequence diagrams showing the flow of setup processing for a reverse direction Sch during hand-off setting (initiation).

FIG. 10 and FIG. 11 are the same as FIG. 8 and FIG. 9, except that the F-Sch in FIG. 8 and FIG. 9 becomes R-Sch, and hence further description thereof is omitted here.

Figure 12:
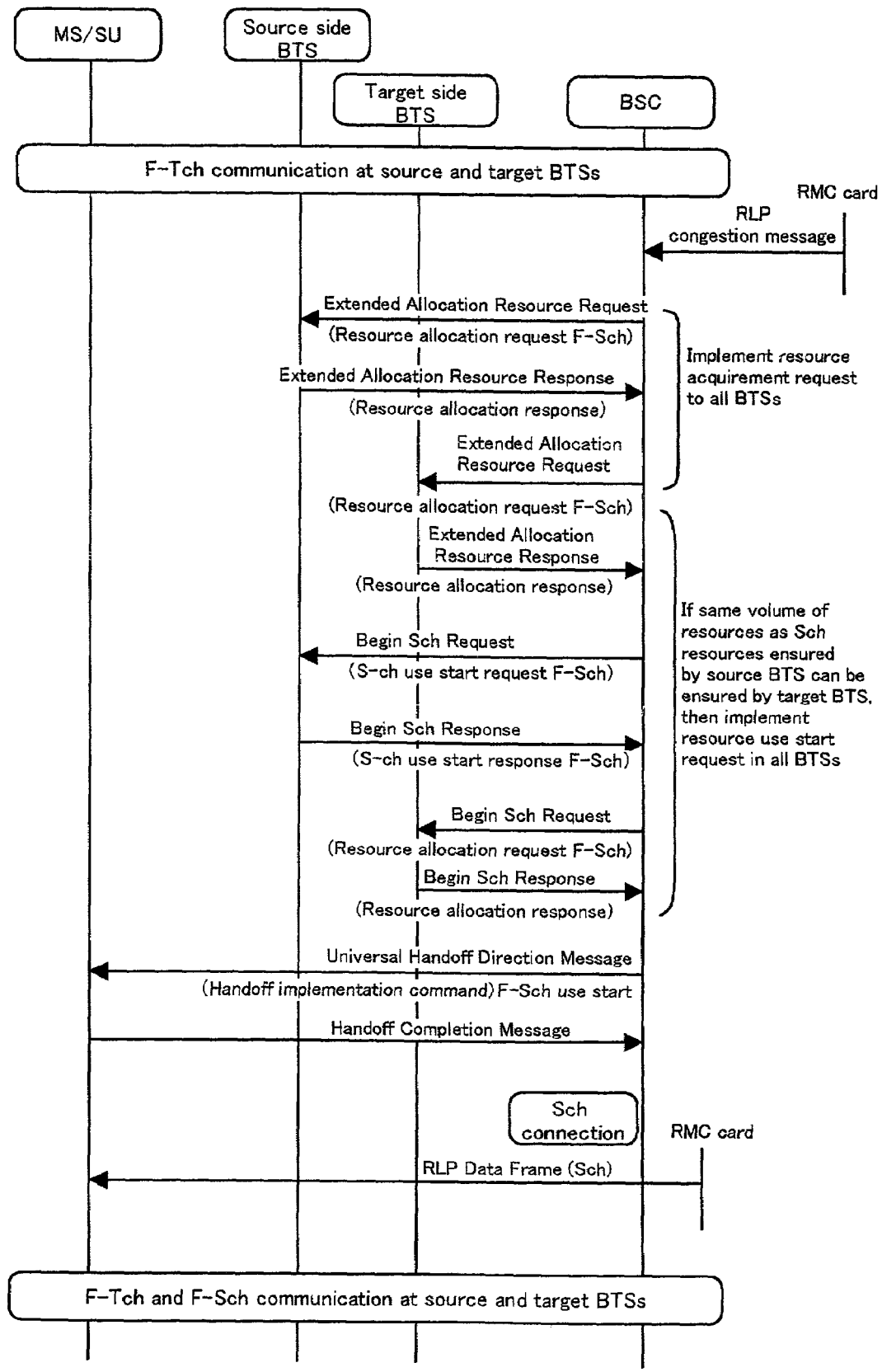
FIG. 12 is a sequence diagram showing the flow of F-Sch setup during a two-way hand-off call using F-Tch.

4. Sch setup processing during hand-off 4.1 Forward direction Sch setup processing FIG. 12 is a sequence diagram showing the flow of F-Sch setup during a two-way hand-off call using F-Tch. Here, F-Sch setup is described in a case where it becomes necessary to establish F-Sch during communication by F-Tch, where F-Tch hand-off is being performed between the MS/SU 1 and the source side BTS 2 and the target side BTS 3.

If a forward direction large volume data transmission factor occurs in the BSC 4 during communications by F-Tch between the MS/SU 1, source side BTS 2, target side BTS 3, and BSC 4, and as a result, RLP congestion arises, then the BSC 4 judges that it is necessary to set up an F-Sch.

The BSC 4 establishes an F-Sch to the source side BTS 2. Specifically, in a similar manner to FIG. 4, the BSC 4 sends a resource allocation request (Extended Allocation Resource Request) for F-Sch to the source side BTS 2. This request contains a requested rate X which is at or below the maximum allowable Sch rate (refer to FIG. 2).

In response to this, the source side BTS 2 sends back a resource allocation response (Extended Allocation Resource Response) to the BSC 4. This response contains the settable rate Y1 (<=X). The source side BTS 2 then updates the empty rate volume information and the BSC 4 updates the rate management information.

The BSC 4 then executes similar processing with respect to the target side BTS 3, and receives a settable rate Y2 from this target side BTS 3.

Here, if Y1>Y2, processing is implemented for aligning the F-Sch bandwidth to the source side BTS 2 with the F-Sch bandwidth to the target side BTS 3. In other words, the BSC 4 sends an Sch release request, which is a message instructing release of the ensured bandwidth Y1, to the source side BTS 2, and in response to this, the source side BTS 2 sends back an Sch release response to the BSC 4. The source side BTS 2 then updates the empty rate volume information (in other words, it adds rate Y1 to the empty rate), and the BSC 4 updates the rate management information (in other words, it adds the set rate Y to the forward side rate information for the corresponding call number). Thereby, the ensured bandwidth Y1 is released.

If, on the other hand, Y1<Y2, then processing is implemented for aligning the F-Sch to the target side BTS 3 with the F-Sch bandwidth to the source side BTS 2. The details of this processing are the same as the processing described above; with the exception that the source side BTS 2 is replaced by the target side BTS 3 in the description, and hence further description thereof is omitted here.

Furthermore, if Y1=Y2, then no bandwidth alignment processing as described above is implemented.

Next, the BSC 4 sends an Sch start request (Begin Sch Request) for F-Sch to the source side BTS 2 and the target side BTS 3, in response to which, the source side BTS 2 and the target side BTS 3 respectively send back an Sch start response (Begin Sch Response) to the BSC 4.

Thereupon, the BSC 4 sends a hand-off implementation notification (Universal Handoff Direction Message) to the MS/SU 1, in response to which, the MS/SU 1 sends back a hand-off completion message to the BSC 4. Thereby, hand-off processing for the F-Sch is completed between the MS/SU 1 and the BTS 2 and 3.

RLP data frames are then transmitted from the BSC 4 to the MS/SU 1 via the established F-Sch, whereupon communications are conducted between the MS/SU 1 and the source side BTS 2 and the target side BTS 3, by means of the F-Sch in addition to the F-Tch, and hence hand-off is implemented by both F-Tch and F-Sch.

Similar processing is carried out in a case where during hand-off by F-Tch to three or more BTS, an F-Sch is established to these BTS and hand-off is also implemented via the F-Sch.

In this way, even when an F-Sch is established for hand-off, during hand-off by F-Tch involving a plurality of BTS, the Sch is set to match the lowest bandwidth of the F-Sch bandwidths that can be guaranteed respectively to the plurality of BTS. Therefore, it is possible to make efficient use of the Sch bandwidth.

4.2 Reverse direction Sch setup processing

Figure 13:
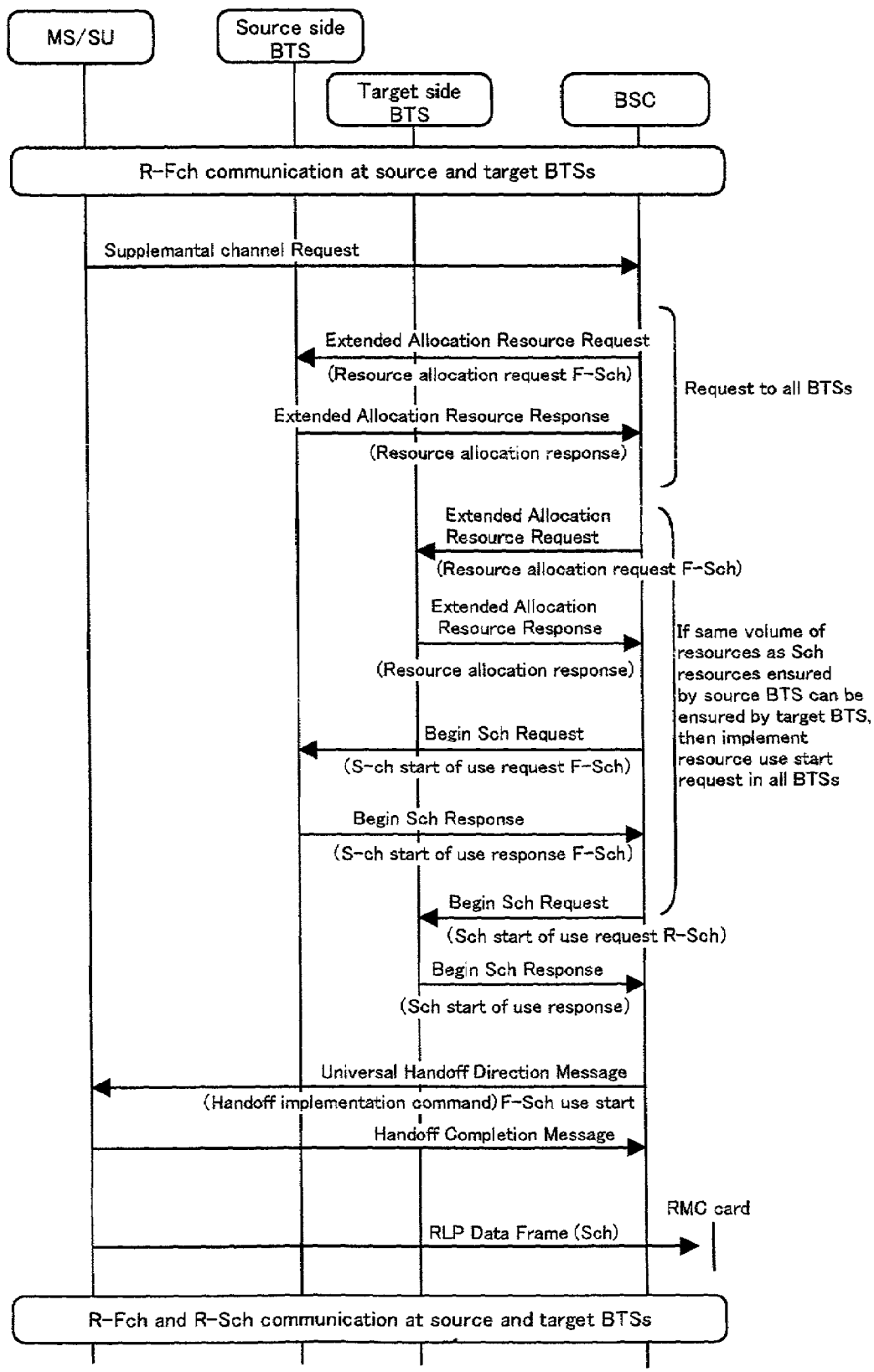
FIG. 13 is a sequence diagram showing the flow of R-Sch setup during two-way hand-off communications.

FIG. 13 is a sequence diagram showing the flow of R-Sch setup during two-way hand-off communications.

FIG. 13 is the same as FIG. 12, except for the fact that the F-Sch in FIG. 12 is replaced by R-Sch, and a supplementary channel request (Supplemental Channel Request) is transmitted by the MS/SU 1. Therefore, further detailed description thereof is omitted here.

5. Method for determining requested rate

A bandwidth ranking (hereinafter, "rank R") for Sch setup and assignment to the Sch, and a recommended bandwidth (hereinafter, "recommended bandwidth") are determined for each MS/SU 1 (in other words, each subscriber), and Sch bandwidths can be allocated on the basis of the determined rank R and recommended rate.

The BSC 4 comprises a recommended rate database, which stores the relationship between the ranks R and the recommended rate, and the rank R assigned to each MS/SU 1.

FIG. 14 shows one example of the structure of a recommended rate database. The recommended rate database stores recommended rate, rank R, timer, and subscriber number. Here, the "recommended rate" is set to 9.6×n (n=1~15) [kbps]. The "timer" is the continuation time set for which the Sch is set.

In this recommended rate database, ranks R=1–6 are allocated to the recommended rate of 9.6 [kbps], and ranks R=7–12 are allocated to the recommended rate of 9.6×2 [kbps], respectively. Six ranks R are allocated respectively to other recommended rates not shown in the diagram. The subscriber numbers (MS/SU 1) assigned to each rank R are linked to that rank R. For example, in FIG. 14, subscribers #1 to #6 are linked to rank R=1, and hence the ranking R of subscribers #1 to #6 is 1.

The ranks R can be calculated by the following equation (2), taking the Sch use time for bandwidth of 9.6×i [kbps] (i=integer between 1 and 15) as $T_i$, the dormant number as D, the short burst data transmission/reception number as S, the Sch allocation rejection number as A, and K, $K_i$, $K_A$, $K_D$, and $K_S$ as weighting coefficients.

$$R=\{(T_1 \times K_1 + T_2 \times K_2 + \ldots + T_i \times K_i + \ldots + T_n \times K_n + A \times K_A) \div (D \times K_D + S \times K_S)\} \times K \quad (2)$$

Here, the use time of $T_i$ and the dormant number of D, and the like, are stored as communication history by BSC 4, or they may be derived from the communication history. Furthermore, if the ranking obtained by equation (2) above contains digits after the decimal point, then these can either be rounded up, rounded down, or discarded, or the like, to convert the R ranking value to an integer.

Figure 15:
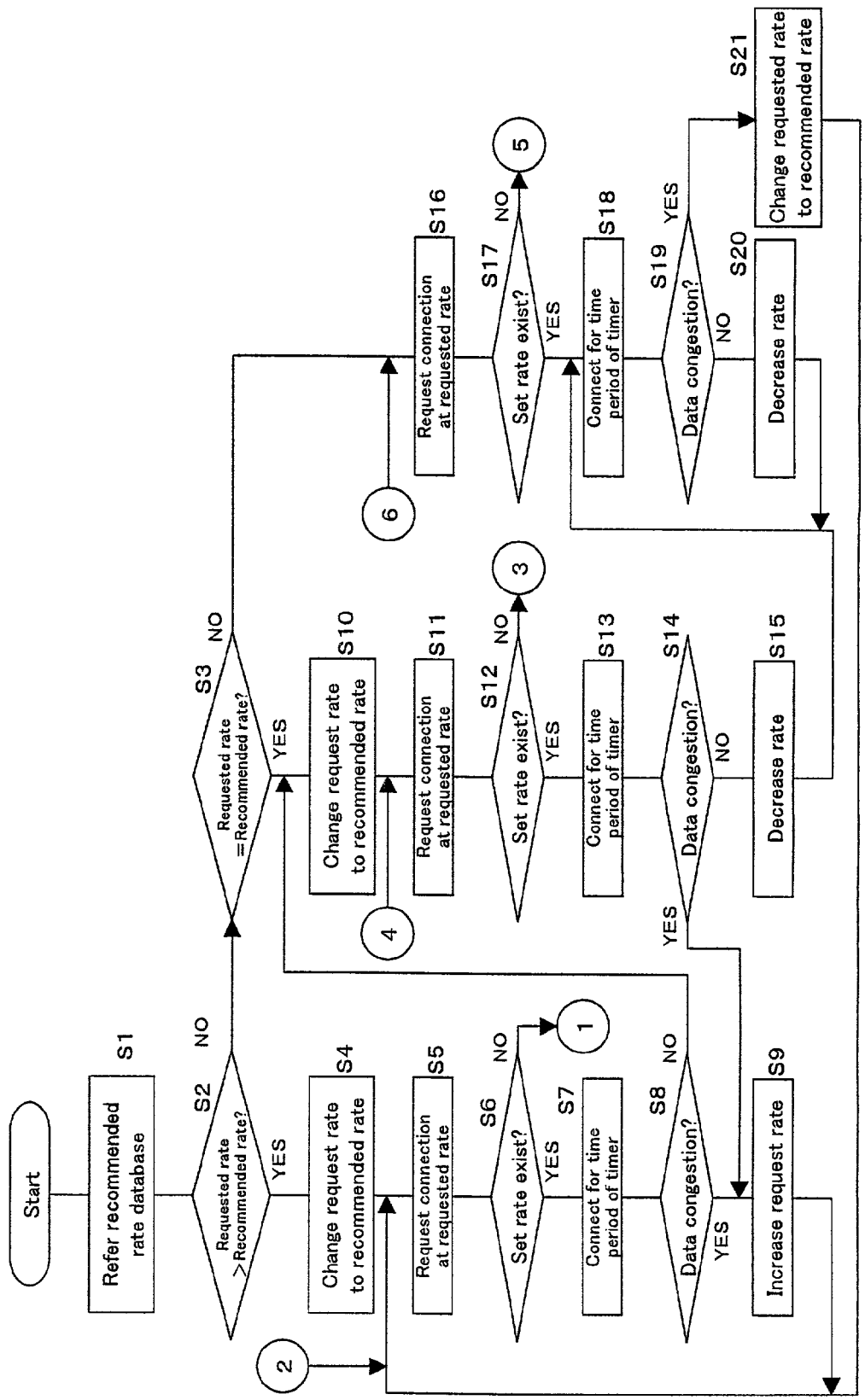
FIGS. 15 and 16 are flowcharts showing the sequence of Sch bandwidth allocation and connection processing when using a recommended rate database.
Figure 16:
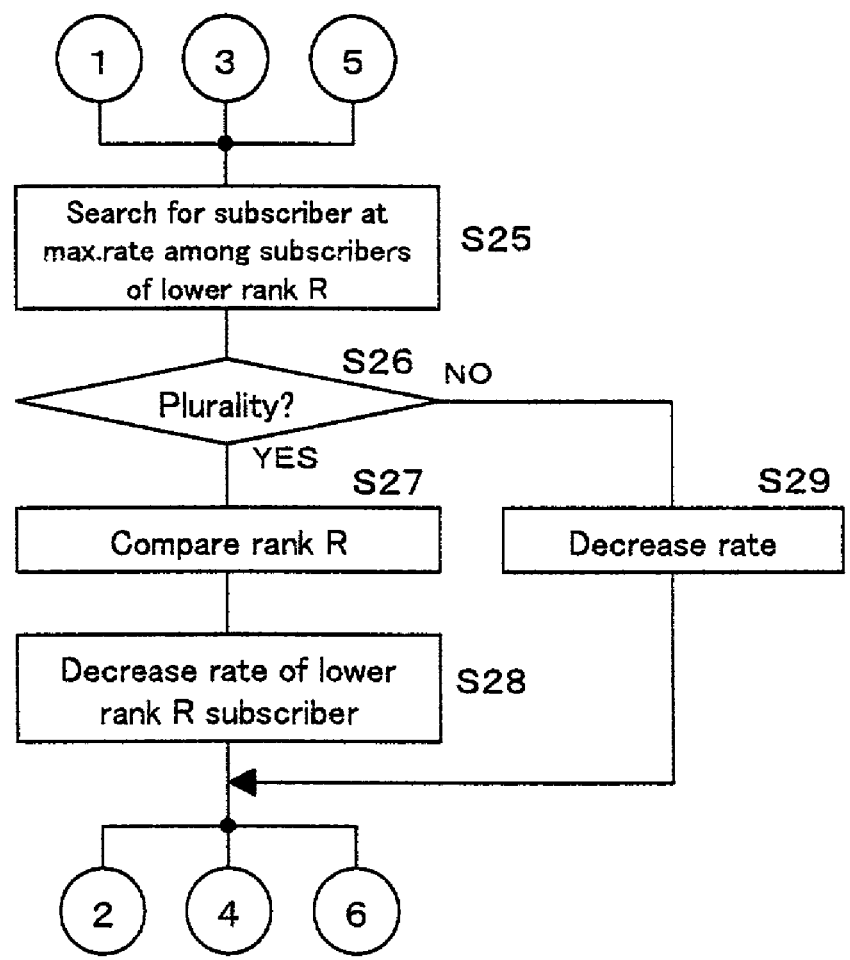

FIG. 15 and FIG. 16 are flowcharts showing the sequence of Sch bandwidth allocation and connection processing when using a recommended rate database.

If the BSC 4 judges that it is necessary to establish an Sch (F-Sch or R-Sch) for data communications, the BSC 4 consults the recommended rate database (S1), and compares the recommended rate allocated to that subscriber (MS/SU 1) with the requested rate (S2, S3).

If the requested rate is greater than the recommended rate (YES at S2), then the BSC 4 changes the requested rate to the recommended rate (S4), and sends a resource allocation request (Extended Allocation Resource Request: see FIG. 4 and FIG. 5) containing the requested rate (=recommended rate), to the BTS 2(3) (S5).

If there is empty rate based on the empty rate volume information (YES at S6), then the BTS 2(3) sends back a resource allocation response containing a set rate equal to or less than the requested rate (Extended Allocation Resource Response: see FIG. 4 and FIG. 5). As described above, if the requested rate can be guaranteed, then a set rate equal to this requested rate is established, and if the requested rate cannot be guaranteed, then the a guaranteeable rate below the requested rate is set.

Thereupon, the BTS 2(3) updates the empty rate volume information, and the BSC 4 updates the rate management information, in addition to which an Sch having the set rate is established for a time period indicated by the timer corresponding to MS/SU 1 to which the Sch is established (see FIG. 4 and FIG. 5; S7).

When the timer period has elapsed, the BSC 4 judges whether or not there is still data to be sent by means of the established Sch, and whether RLP congestion has arisen (S8). If congestion has arisen (YES at S8), the BSC 4 increases the requested rate for that subscriber (S9). In increasing the requested rate for the subscriber, the rate may be set unilaterally to the maximum rate of 144 (=9.5×15 [kbps]), regardless of the rank R of the subscriber, or it may be set to a value corresponding to the rank R of the subscriber. Thereupon, processing is repeated from step S5.

If, at step S8, it is judged that no congestion has occurred (NO at S8), then the BSC 4 executes the processing from step S10 to S14. This processing is the same as the respective processes in steps S4 to S8 described previously.

At step S14, if it is judged that there is data congestion (YES at S14), then BSC 4 proceeds to step S9, whereas if it is judged that there is no data congestion (NO at S14), then rate reduction processing is performed (S15). Rate reduction processing is performed, for example, by reducing the currently set rate by ½.

Thereupon, a connection is provided for the time period indicated by the timer (S18) and is then judged again whether or not there is congestion (S19). If there is no congestion (NO at S19), then rate reduction processing is executed (S20), and the processing is repeated from step S18. If there is congestion (YES at S19), then the requested rate is set to the recommended rate (S21), and the processing is repeated from step S5.

If the requested rate is equal to the recommended rate at step S2 and S3, (YES at S3), then the requested rate is set to the recommended rate (step S10), and processing is implemented from step S11, described above.

At steps S6, S12 and S17, if the BTS 2(3) does not have a settable rate according to the empty rate volume information (NO at S6, S12, S17), then the BTS 2(3) sends back an NG message to the BSC 4. In this case, the BSC 4 executes processing for reducing the rate of subscribers having a lower rank R than the subscriber who is seeking to establish an Sch.

More specifically, the BSC 4 searches the rate management information and the recommended rate database for subscribers operating at maximum rate amongst the subscribers having a lower rank R than the subscriber seeking to establish an Sch (S25).

If a plurality of such subscribers are found (YES at S26), then the set rate of the subscriber having the lowest rank R of this plurality of subscribers is reduced (S28). If there exist a plurality of subscribers having a lowest rank R, then any one of these subscribers is selected. The rate reduction is implemented by, for example, setting the rate of the selected subscriber to one half of the current rate. The BTS 2(3) updates the empty rate volume information and the BSC 4 updates the rate management information, respectively, according to the rate reduction processing.

At step S26, if there is only one subscriber at maximum rate (NO at S26), then the BSC 4 implements rate reduction processing for that subscriber (S29).

Thereupon, the processing returns to step S4 when branching from the judgement block at step S6, it returns to step S11 when branching from the judgement block at step S12, and it returns to step S16 when branching from step S17.

In this way, since preferential allocation is implemented whilst also allocating rates according to the ranks of subscribers, the service performance is improved. In other words, since a larger bandwidth corresponding to the subscriber's rank is allocated preferentially to a subscriber of higher rank, it is possible to provide a sense of security, in that a subscriber can perform communications without the communication being rejected, whilst also encouraging subscription and providing good usability.

As described above, according to the present invention, it is possible to make efficient use of the bandwidth of channels having variable bandwidth (for example, supplementary channels in a cdma2000 system).

What is claimed is:

1. A channel setting method in a mobile communication system in which a first channel of fixed bandwidth, and a second channel of variable bandwidth established according to requirements, are set up between a mobile station and a plurality of base stations performing radio communications with said mobile station, and between said plurality of base stations and a base station controller which communicates with said plurality of base stations and controls said base stations, said channel setting method being a method for setting said second channel during band-off where said mobile station is communicating with said plurality of base stations by means of said first channel, and comprising the steps of:

in said base station controller, sending a request for a bandwidth required for said second channel to said plurality of base stations communicating by means of said first channel;

in said plurality of base stations, upon receiving said request, returning a response of an allocatable bandwidth equal to or lower than said requested bandwidth, to said base station controller; and in said base station controller, upon receiving said responses, setting said second channel between said mobile station and said plurality of base stations, and between said plurality of base stations and said base station controller, according to the smallest bandwidth of said plurality of allocatable bandwidths.

2. A channel setting method in a mobile communication system in which a first channel of fixed bandwidth, and a second channel of variable bandwidth established according to requirements, are set up between a mobile station and a first and a second base station perforating radio communications with said mobile station, and between said first and second base stations and a base station controller which communicates with said base stations and controls said base stations, said channel setting method being a method for setting said second channel between said mobile station and said second base station at the start of handoff where said mobile station starts to communicate simultaneously with said second base station whilst also communicating with said first base station by means of said first and second channel, and comprising the steps of:
  in said base station controller, sending a request for a bandwidth required for said second channel to said second base station;
  in said second base station, upon receiving said request, returning a response of an allocatable bandwidth equal to or lower than said requested bandwidth, to said base station controller; and
  in said base station controller, upon receiving said response from said second base station,
  comparing said allocatable bandwidth with the bandwidth of the second channel established to said first base station; and
  in a case where the former bandwidth is lower than the latter bandwidth, changing the bandwidth of the second channel established to said first base station to the former bandwidth, and also establishing said second channel between said mobile station and said second base station, and between said second base station and said base station controller, in accordance with said former bandwidth.

3. The channel setting method according to claim 2, further comprising the step of:
  in said base station controller, setting said second channel between said mobile station and said second base station and between said second base station and said base station controller, according to the bandwidth of the second channel established with said first base station, in a case where said allocatable bandwidth is greater than the bandwidth of the second channel established with said first base station.

4. A channel setting method in a mobile communication system in which a first channel of fixed bandwidth, and a second channel of variable bandwidth established according to requirements, are set up between a mobile station and a plurality of base stations performing radio communications with said mobile station, and between said plurality of base stations and a base station controller which communicates with said plurality of base stations and controls said base stations, said channel setting method being a method for setting said second channel dining hand-off where said mobile station is communicating with said plurality of base stations by means of said first channel, being performed under control of said base station controller, and comprising the steps of:
  sending a request for a bandwidth required for said second channel to said plurality of base stations communicating by means of said first channel;
  receiving a response of an allocatable bandwidth equal to or lower than said requested bandwidth, as sent by said plurality of base stations; and
  setting said second channel between said mobile station and said plurality of base stations, and between said plurality of base stations and said base station controller, according to the smallest bandwidth of said received plurality of allocatable bandwidths.

5. A channel setting method in a mobile communication system in which a first channel of fixed bandwidth, and a second channel of variable bandwidth established according to requirements, are set up between a mobile station and a first and a second base station performing radio communications with said mobile station, and between said first and second base stations and a base station controller which communicates with said base stations and controls said base stations, said channel setting method being a method for setting said second channel between said mobile station and said second base station at the stan of handoff where said mobile station starts to communicate simultaneously with said second base station whilst also communicating with said first base station by means of said first and second channel, being performed under control of said base station controller, and comprising the steps of:
  sending a request for a bandwidth required for said second channel to said second base station;
  receiving a response of an allocatable bandwidth equal to or lower than said requested bandwidth, as sent by said second base station; and
  comparing said allocatable bandwidth with the bandwidth of the second channel established to said first base station, and, if the former bandwidth is lower than the latter bandwidth, changing the bandwidth of the second channel established to said first base station to the former bandwidth, and also establishing said second channel between said mobile station and said second base station and between said second base station and said base station controller, in accordance with said former bandwidth.

6. A mobile communication system comprising a mobile station, a plurality of base stations performing radio communications with said mobile station, and a base station controller communicating with said plurality of base stations and controlling said plurality of base stations, in which a first channel of fixed bandwidth, and a second channel of variable bandwidth established according to requirements, are set up between a mobile station and said plurality of base stations, and between said plurality of base stations and said base station controller,
  wherein said base station controller comprises:
    a transmitting portion for sending a request for a bandwidth required for said second channel to said plurality of base stations communicating by means of said first channel, when it is necessary to establish said second channel during band-off where said mobile station is communicating with said plurality of base stations by means of said first channel,
    a first receiving portion for receiving a response of an allocatable bandwidth equal to or lower than said requested bandwidth, as transmitted by said base stations in response to the transmission from said transmitting portion; and
    a setting portion for setting said second channel between said mobile station and said plurality of base stations, and between said plurality of base stations and said base station controller, according to the smallest bandwidth of said plurality of allocatable bandwidths received via said first receiving portion; and
  said plurality of base stations comprise, respectively:
    a second receiving portion for receiving said request; and
    a response portion for returning said response of said allocatable bandwidth equal to or lower than the requested bandwidth received via said second receiving section, to said base station controller.

7. A mobile communication system comprising a mobile station, a first and second base stations performing radio communications with said mobile station, and a base station controller communicating with said first and second base stations and controlling said base stations, wherein a first channel of fixed bandwidth, and a second channel of variable bandwidth established according to requirements, are set up between said mobile station and said first and second base station, and between said first and second base stations and said base station controller, wherein said base station controller comprises:
a transmitting portion for sending a request for a bandwidth required for said second channel to said second base station, at the start of handoff where said mobile station starts to communicate simultaneously with said second base station whilst also communicating with said first base station by means of said first and second channels;
a first receiving portion for receiving a response of an allocatable bandwidth equal to or lower than said requested bandwidth, from the second base station, in response to the
a changing portion for comparing the allocatable bandwidth received by said first receiving portion with the bandwidth of the second channel established to said first base station, and, if the former bandwidth is lower than the latter bandwidth, changing the bandwidth of the second channel established to said first base station to the former bandwidth; and
a setting portion for setting said second channel between said mobile station and said second base station, and between said second base station and said base station controller, in accordance with said former bandwidth; and said second base station comprises:
a second receiving portion for receiving said request sent by said transmitting portion of said base station controller; and
a response portion for returning said response of said allocatable bandwidth equal to or lower than said requested bandwidth as received via said second receiving portion, to said base station controller.

8. A base station controller in a mobile communication system comprising a mobile station, a plurality of base stations performing radio communications with said mobile station, and said base station controller communicating with said plurality of base stations and controlling said base stations, a first channel of fixed bandwidth and a second channel of variable bandwidth established according to requirements being set up between said mobile station and said plurality of base stations, and between said base stations and said base station controller in said mobile communication system, comprising:

a transmitting portion for sending a response for a bandwidth required for said second channel to said plurality of base stations communicating by means of said first channel, when it is necessary to establish said second channel during hand-off where said mobile station is communicating with said plurality of base stations by means of said first channel;
a first receiving portion for receiving a response of an allocatable bandwidth, as transmitted by said base stations in response to the transmission from said transmitting portion; and
a setting portion for setting said second channel between said mobile station and said plurality of base stations, and between said plurality of base stations and said base station controller, according to the smallest bandwidth of said plurality of allocatable bandwidths received via said first receiving portion.

9. A base station controller in a mobile communication system comprising a mobile station, a first and a second base station performing radio communications with said mobile station, and said base station controller communicating with said first and second base stations and controlling said base stations, a first channel of fixed bandwidth and a second channel of variable bandwidth established according to requirements being set up between said mobile station and said first and second base stations, and between said first and second base stations and said base station controller, comprising:

a transmitting portion for sending a request for a bandwidth required for said second channel to said second base station, at the start of handoff where said mobile station starts to communicate simultaneously with said second base station whilst also communicating with said first base station by means of said first and second channels;
a first receiving portion for receiving a response of an allocatable bandwidth, as sent from the second base station in response to the transmission from said transmitting portion;
a changing portion for comparing the allocatable bandwidth received via said first receiving portion with the bandwidth of the second channel established to said first base station, and, if the former bandwidth is lower than the latter bandwidth, changing the bandwidth of the second channel established to said first base station to the former bandwidth; and
a setting portion for setting said second channel between said mobile station and said second base station, and between said second base station and said base station controller, in accordance with said former bandwidth.

* * * * *